US012332977B2

(12) United States Patent
Paliwal et al.

(10) Patent No.: US 12,332,977 B2
(45) Date of Patent: Jun. 17, 2025

(54) METHOD AND SYSTEM FOR WATERMARKING A USB PD PROTOCOL HARDWARE SUB-SYSTEM

(71) Applicant: SILICONCH SYSTEMS PVT LTD, Karnataka (IN)

(72) Inventors: Shubham Paliwal, Uttar Pradesh (IN); Rakesh Kumar Polasa, Karnataka (IN); Vishnu Mohan Pusuluri, Karnataka (IN); Venugopal Jennarapu, Karnataka (IN)

(73) Assignee: Siliconch Systems Pvt Ltd, Karnataka (IN)

( * ) Notice: Subject to any disclaimer, the term of this patent is extended or adjusted under 35 U.S.C. 154(b) by 266 days.

(21) Appl. No.: 17/857,298

(22) Filed: Jul. 5, 2022

(65) Prior Publication Data
US 2023/0267184 A1 Aug. 24, 2023

(30) Foreign Application Priority Data
Feb. 18, 2022 (IN) .............................. 202241008679

(51) Int. Cl.
*G06F 21/16* (2013.01)
*G06F 1/3215* (2019.01)
*G06F 21/44* (2013.01)

(52) U.S. Cl.
CPC ............ *G06F 21/16* (2013.01); *G06F 1/3215* (2013.01); *G06F 21/44* (2013.01)

(58) Field of Classification Search
CPC ...... G06F 21/16; G06F 1/3215; G06F 3/1243; G06F 2221/034; G06F 21/57
See application file for complete search history.

(56) References Cited

U.S. PATENT DOCUMENTS

2007/0220263 A1* 9/2007 Ziener ..................... G06F 21/81
 713/176
2017/0370964 A1* 12/2017 Chen .................... G01R 1/0416
2022/0244309 A1* 8/2022 Sirisha ............... G01R 31/3167

FOREIGN PATENT DOCUMENTS

EP 1835425 B1 4/2009

OTHER PUBLICATIONS

Universal Serial Bus Type-C Cable and Connector Specification Release 2.0, USB 3.0 Promoter Group, Aug. 2019 (373 pages).
(Continued)

*Primary Examiner* — Rupal Dharia
*Assistant Examiner* — Matthias Habtegeorgis
(74) *Attorney, Agent, or Firm* — Procopio, Cory, Hargreaves & Savitch LLP

(57) ABSTRACT

A system for watermarking a USB Type-C and PD protocol hardware sub-system existing as a part of a SOC/IC system includes a tester to generate a watermarking signal, a device under test (DUT), wherein the DUT is configured with a USB Type-C port with power delivery implementation and including a hardware subsystem configured for watermarking the DUT and transmit a response signal upon receipt of the watermarking signal from the tester. The tester includes a controller including one or more processors that execute a set of executable instructions that are stored in a memory, upon which execution, the processor causes the controller to generate the watermarking signal, the watermarking signal comprises a custom signal and a custom packet associated with a configured custom signal stored in a data buffer that is associated with the SOC/IC system, and transmit the watermarking signal on one or more configuration channel (CC) lines.

14 Claims, 5 Drawing Sheets

(56) References Cited

OTHER PUBLICATIONS

Universal Serial Bus Power Delivery Specification, Revision 3.0, Version 2.0, Aug. 29, 2019 (657 pages).

* cited by examiner

METHOD AND SYSTEM FOR WATERMARKING A USB PD PROTOCOL HARDWARE SUB-SYSTEM

TECHNICAL FIELD

The present application is based on and claims priority from Indian Patent Application No. 202241008679, filed on Feb. 18, 2022, the entire content of which is incorporated herein by reference.

The present disclosure relates to methods and systems for watermarking electronic systems. More particularly, the present disclosure relates to a method and system for watermarking a USB PD protocol hardware sub-system.

BACKGROUND

Background description includes information that can be useful in understanding the present invention. It is not an admission that any of the information provided herein is prior art or relevant to the presently claimed invention, or that any publication specifically or implicitly referenced is prior art.

Universal Serial Bus (USB) is an industry protocol designed to standardize interfaces between computing devices for communication and for supplying electrical power. The USB protocols have enjoyed widespread adoption in nearly every computing device, and have received tremendous support in terms of technology development with well-established and standardized software infrastructure. USB is one of most common interfaces for connecting a variety of peripherals to computers and providing relatively local and small levels of data transfer. USB interfaces can be found on everything from personal computers and laptops, to peripheral devices, mobile phones, cameras, flash memory sticks, back up hard-drives and many other devices. USB has been implemented in several versions to meet data transfer and power requirements. The versions can include USB 1, USB 1.1, USB 2.0 and USB 3.1, USB BC 1.2, USB PD, etc.

USB is a host-centric plug-and-play bus. A logical USB bus connects USB devices with USB host, using a physical tiered star topology. A system has one host with a hub at the centre of each star. Hubs convert a single attachment point (i.e., port) into multiple attachment points. The upstream port of a hub connects the hub towards the host. Each of the downstream ports of a hub allows connection to another hub or a function. Each wire segment is a point-to-point connection between the host and a hub or function, or a hub connected to another hub or function. A function of a USB device to transmit or receive data or control information over the bus and as such provide capabilities to the system. Examples of functions include locator devices, such as a mouse, tablet, or light pen, input devices, such as a keyboard or a scanner, output devices, such as a printer or digital speakers, and a telephony adapter. Each function contains configuration information that describes its capabilities and resource requirements. Before a function can be used, the host must configure it. This configuration includes allocating USB bandwidth and selecting function-specific configuration options.

USB ports are implemented extensively to connect peripheral devices to computing devices such as computer, laptop, personal digital assistant (PDA) etc. USB ports can be implemented for providing charging of various electronic devices and computing devices. There are general peripheral connections connected through USB such as printers, scanners, zip drives, digital cameras, mice, joysticks, modems, speakers, telephones, video phones and any other network connections. A USB cable, according to a certain USB standard, has a power supply line of +5V, a ground line, and two D+ and D− signal lines. The USB cable, according to the USB standard, can supply a predefined or predetermined current in mA at +5V while transmitting signals. A type of performing charging using this power supply is called USB charging. USB connectors are provided at either end of USB cable to enable connection between any or a combination of computing devices, electronic devices, power adapter etc. through USB ports. USB connectors can be of multiple types such as USB type-A connector, USB type-B connector, USB type-C connector, Mini-USB (of both type-A and type-B), Micro-USB (of both type-A and type-B) etc. According to USB connectors, there can be corresponding USB ports or sockets (such as type-A, type-B, type-C, Mini-USB, Micro-USB etc.).

USB PD is a significant USB standard in the evolutionary stage of the USB protocol since it is directed to a power supply aspect. The USB PD involves a nominal voltage of up to 20V and with the advent of this desirable USB standard, many issues have surfaced one such issue is possible pirating of a USB PD implemented device. One solution to solve this specific problem is by formulating and implementing a mechanism that identifies USB PD implemented devices that have been pirated. This solution also accounts for due and proper inventorying of USB PD implemented devices especially on the manufacturer's side. In simple terms, watermarking refers to the creation of a signature or an identification by either altering a respective object such that the alteration may only be identified by the original maker or otherwise placing a marker that can only be perceived in a certain way and which way is only known to the original maker. With regards to the present disclosure, the identification mechanism that is the effective watermarking of computer systems (System on a chip (SOC)/integrated circuit (IC) for example) that have a USD PD sub-system is thus highly desired.

Efforts have been made in the related or existing art to watermark USB PD protocol hardware sub-systems associated with a computer system but none have been adequately fruitful, eventful, or useful.

European patent document EP1835425B1 discloses a watermarking apparatus for an electronic circuit. The watermarking apparatus includes a memory having a watermark associated with an electronic circuit, a signal generator that generates a signal associated with the watermark on a power supply line, and which signal is recognizable as being associated with the watermark. While this disclosure is directed generally to electronic circuits, the disclosure is inadequate and leaves room for providing an improved watermarking mechanism.

A non-patent literature titled "Watermarking for Intellectual Property Protection" which was published in 2003 and which was authored by Y. C. Fan and H. W. Tsao also attempted to provide a disclosure pertaining to watermarking mechanisms. This document discloses a method that utilized a stream of bits as a watermark which was embedded into a self-test circuit to represent ownership so a concerned person can identify the self-test circuit. However, this document is directed to solving the problem of IP protection and is primarily utilized with low hardware blocks. As such, a need for an improved watermarking system remains unfulfilled.

Therefore, there is a need in the art to provide a reliable and efficient method and system for watermarking a USB PD protocol hardware sub-system that forms part of an SOC/IC system. Further, there is a need to provide a method and system to configure a signalling detection mechanism associated with the USB PD protocol sub-system based on pre-defined configurations for watermarking the USB PD protocol sub-system.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

SUMMARY

Some of the exemplary objects of the present disclosure, which at least one embodiment herein satisfies are as listed herein below.

It is an exemplary object of the present disclosure to provide a method and system for watermarking a USB PD protocol hardware subsystem existing as a slave to an SOC/IC system.

It is another exemplary object of the present disclosure to provide a simple and cost-effective method and system for watermarking a USB PD protocol hardware subsystem existing as a slave to an SOC/IC system.

It is another exemplary object of the present disclosure to provide a reliable and efficient method and system for watermarking a USB PD protocol hardware subsystem existing as a slave to an SOC/IC system.

It is another exemplary object of the present disclosure to provide a robust method and system for watermarking a USB PD protocol hardware subsystem existing as a slave to an SOC/IC system.

The present disclosure relates to methods and systems for watermarking electronic systems. More particularly, the present disclosure relates to a method and system for watermarking a USB PD protocol hardware sub-system associated with an SOC/IC system.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of the present disclosure pertains to a system for watermarking a USB PD protocol hardware sub-system associated with a SOC/IC system. The system may include a tester, and a device under test (DUT). The tester may be configured to generate a watermarking signal and the DUT may be configured with a USB Type-C port with power delivery implementation having a hardware subsystem configured for watermarking the DUT and transmit a response signal upon receipt of the watermarking signal from the tester. The tester may further include a controller having one or more processors that executes a set of executable instructions that are stored in a memory, upon which execution, the processor causes the controller to generate the watermarking signal including a custom signal and a custom packet associated with a configured custom signal stored in a data buffer that is associated with the SOC/IC system. The tester may further transmit the watermarking signal on one or more configuration channel (CC) lines coupled to the Type-C port of the USB PD protocol hardware sub-system associated with the DUT and then detect, by a watermarking detection mechanism of the tester, the response signal generated and transmitted by the hardware subsystem of the DUT, the response signal is a response to the watermarking signal transmitted by the tester. The tester may further determine, by a watermarking indication interface associated with the tester, from the response signal received if the DUT is a watermarked or a non-watermarked device based on comparison of the custom signal and the custom packet with a predefined value provided by the tester.

In an aspect, the custom signal and the custom packet further may include a combination of a preamble, one or more ordered sets composed of K-Codes and an—end of packet (EOP). The predefined value may be based on the one or more ordered sets composed of K codes.

In an aspect, the DUT may be coupled to a USB PD transceiver that receives the watermarking signal and transmits the response signal if the DUT is a watermarked device. The response signal may be a combination of a preamble, start of packet (SOP) Ordered Set, a Vendor ID and or a secret code, a cyclic redundancy code (CRC) and an EOP.

In an aspect, the detection of the watermarking signal is based on the one or more ordered sets composed of K-Codes, wherein identification of whether the DUT is a watermarked device by the watermarking identification interface is based on any or a combination of the vendor identity construct of the USB PD specification, and a secret code corresponding to the predefined value provided by the tester.

In an aspect, the system may be associated with a look-up table associated with the SOC/IC system. The look-up table may include a plurality of configured custom signals with at least one of the pluralities of the configured custom signals corresponding to a watermarking signal detected by the watermark detection mechanism. Further, the transmission of the response signal to the watermark indication interface may be by associated configuration channel lines of the USB PD transceiver.

In an aspect, the data buffer associated with the SOC/IC system may be a transmitting or a receiving buffer.

An aspect of the present disclosure pertains to a tester for watermarking a USB PD protocol hardware sub-system associated with a SOC/IC system. The tester for watermarking may include a watermark signal generation mechanism, a controller, a watermarking detection mechanism, and a watermarking indication interface. The watermark signal generation mechanism may be configured to generate a watermarking signal to be transmitted on one or more configuration channel (CC) lines in a USB PD protocol hardware sub-system of a device under test (DUT) during an operation. The watermarking signal may further include a custom signal and a custom packet associated with a configured custom signal stored in a data buffer that is associated with the SOC/IC system. The controller may include one or more processors that executes a set of executable instructions that are stored in a memory, upon which execution, the processor causes the controller to transmit the watermarking signal on one or more configuration channel (CC) lines coupled to the Type-C port of the USB PD protocol hardware sub-system of the DUT. Furthermore, the watermarking detection mechanism may detect a response signal transmitted by the DUT, the response signal may be a response to the watermarking signal transmitted by the controller. The watermarking indication interface may then determine from the response signal received if the DUT is a watermarked or a non-watermarked device.

In an aspect, the tester may detect the response signal from the DUT if the DUT is a watermarked device. The response signal can be a combination of a preamble, start of packet (SOP) Ordered Set, a vendor identity (ID) and a secret code, a cyclic redundancy code (CRC) and an EOP.

In an aspect, the tester may provide the custom packet to a USB PD receiver in a predetermined format of the system and the tester decodes the response signal received in response to the custom packet sent by the tester to match the any or a combination of the vendor identity and the secret code built in the system.

In an aspect, the tester may test any device with a USB Type-C port in field without having a need to have special probes or lab equipment.

An aspect of the present disclosure pertains to a hardware subsystem operatively coupled to a device under test (DUT). The hardware subsystem may include a watermarking signal detection module that may be configured to detect a watermarking signal transmitted by a tester on a configuration channel (CC) line coupled to a Type-C port of a USB PD protocol associated with the hardware subsystem, the tester configured to test the DUT whether the DUT is watermarked or not. The watermarking signal may include a custom signalling including a combination of K-Codes, other than those defined in USB PD Specification. The watermarking signal detection module may then automatically take control of a USB PD stack and a bus interface, bypassing the SOC/IC microcontroller, associated with the hardware sub-system through a multiplexer structure and then respond with a response signal including a pre-defined packet having a vendor identity and a secret code corresponding to the combination of K-codes received. The watermarking signal detection module may further transmit the response signal through a buffer in the existing USB PD stack. The response signal may be fetched through a key-value mechanism implying a unique code corresponding to each combination of K-codes sent by the tester. Post transmission, the watermarking detection module provide control back to the SOC/IC microcontroller for normal functioning of DUT.

An aspect of the present disclosure pertains to a method for watermarking a USB PD protocol hardware sub-system existing as a part of a SOC/IC system. The method for watermarking may include the steps of generating a watermarking signal by a tester, the watermarking signal may include a custom signal and a custom packet associated with a configured custom signal stored in a data buffer that is associated with the SOC/IC system. The tester may further include a controller having one or more processors that executes a set of executable instructions that are stored in a memory. The method may further include transmitting the watermarking signal by the tester on one or more configuration channel (CC) lines coupled to a Type-C port of the USB PD protocol hardware sub-system associated with a device under test (DUT) and detecting, by a watermarking detection mechanism of the tester, a response signal generated and transmitted by the hardware subsystem of the DUT, the response signal may be a response to the watermarking signal transmitted by the tester. The method may further include the step of determining, by a watermarking indication interface associated with the tester from the response signal received if the DUT is a watermarked or a non-watermarked device based on comparison of the custom signal and the custom packet with a predefined value provided by the tester.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The diagrams are for illustration only, which thus is not a limitation of the present disclosure, and wherein.

DETAILED DESCRIPTION

Figure 1A:
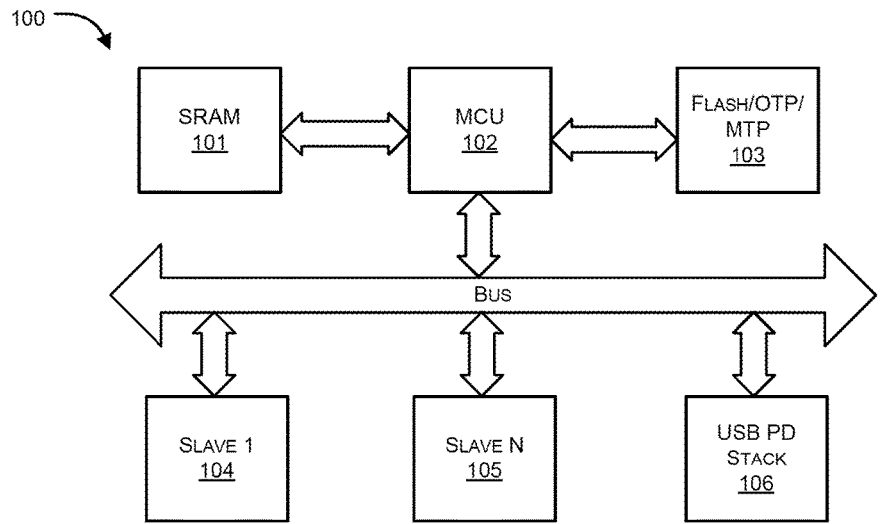
FIG. 1A illustrates a typical USB Type-C and PD protocol hardware sub-system associated with a SOC/IC system without the presence of a watermark.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to methods and systems for watermarking electronic systems. More particularly, the present disclosure relates to a method and system for watermarking a USB PD protocol hardware sub-system.

Figure 1B:
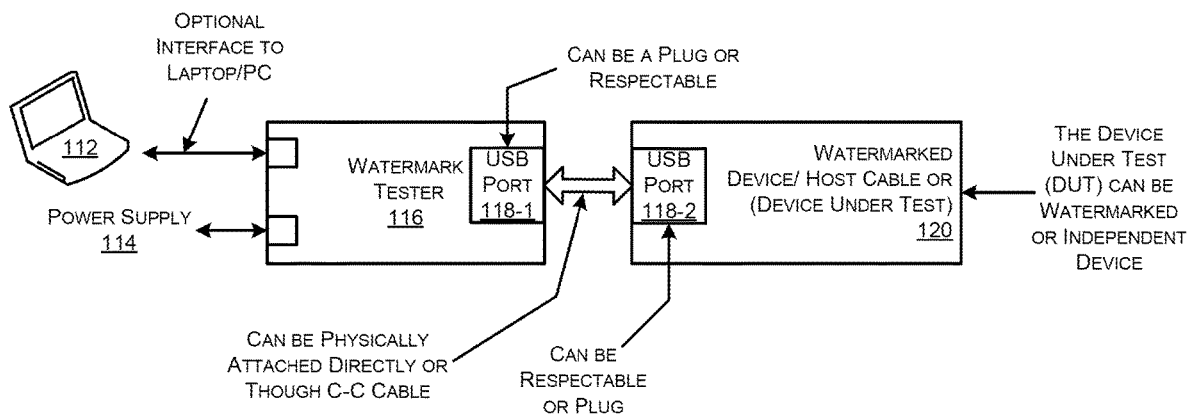
FIG. 1B illustrates system architecture for testing for watermark in a watermark or non-watermark device, in accordance with an embodiment of the present disclosure.
Figure 1C:
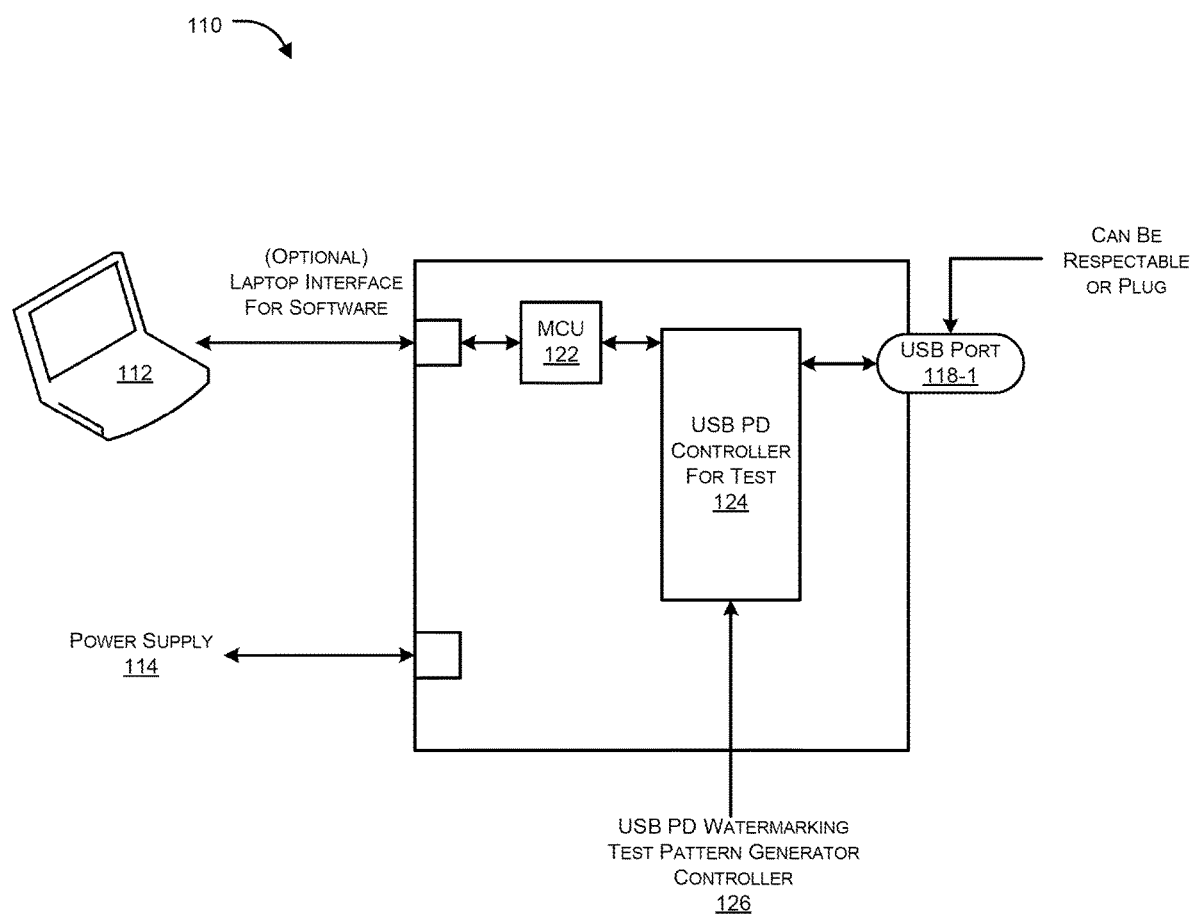
FIG. 1C illustrates an exemplary representation of a tester, in accordance with an embodiment of the present disclosure.

FIG. 1A illustrates a typical USB PD protocol hardware sub-system associated with a SOC/IC system without the presence of a watermark. FIG. 1B illustrates a system architecture for testing for watermark in a watermark or non-watermark device having a USB Type-C port while FIG. 1C illustrates an exemplary representation of a tester. As illustrated in FIG. 1B, the system architecture may include a watermark tester 116 (simply referred to as the tester 116 hereinafter). The tester 116 may be provided with an interface to connect to one or more computing devices 112 such as a laptop, PC, smart phone and the like. The tester 116 may further be configured with a power supply unit 114 and a USB Type-C port 118-1. The USB Type-C port 118-1 can be a plug, a receptable but not limited to the like. The USB Type-C port 118-1 of the tester 116 can be physically attached directly or through a USB Type-C to USB Type-C cable but not limited to the like to a USB Type-C port 118-2 of a device under test (DUT) 120. The DUT 120 can be a watermarked device, host, cable or any independent device. The USB-C (or USB Type-C) port 118-2 of the DUT 120 can be a plug, a receptable but not limited to the like. In an exemplary embodiment, the DUT 120 can be configured with a USB Type-C port with power delivery implementation and may include a hardware subsystem configured for watermarking the DUT and transmit a response signal upon receipt of a watermarking signal from the tester 116.

FIG. 1C illustrates the tester 116 that with an interface to connect to one or more computing devices 112 such as a laptop, PC, smart phone and the like. The tester 116 may further be configured with a power supply unit 114 and a USB Type-C port 118-1. The USB Type-C port 118-1 can be a plug, a receptable but not limited to the like. The tester 116 further may include a processing unit such as a microcontroller unit (MCU) 122 but not limited to it and a USB Type-C and PD controller for test 124.

Figure 2:
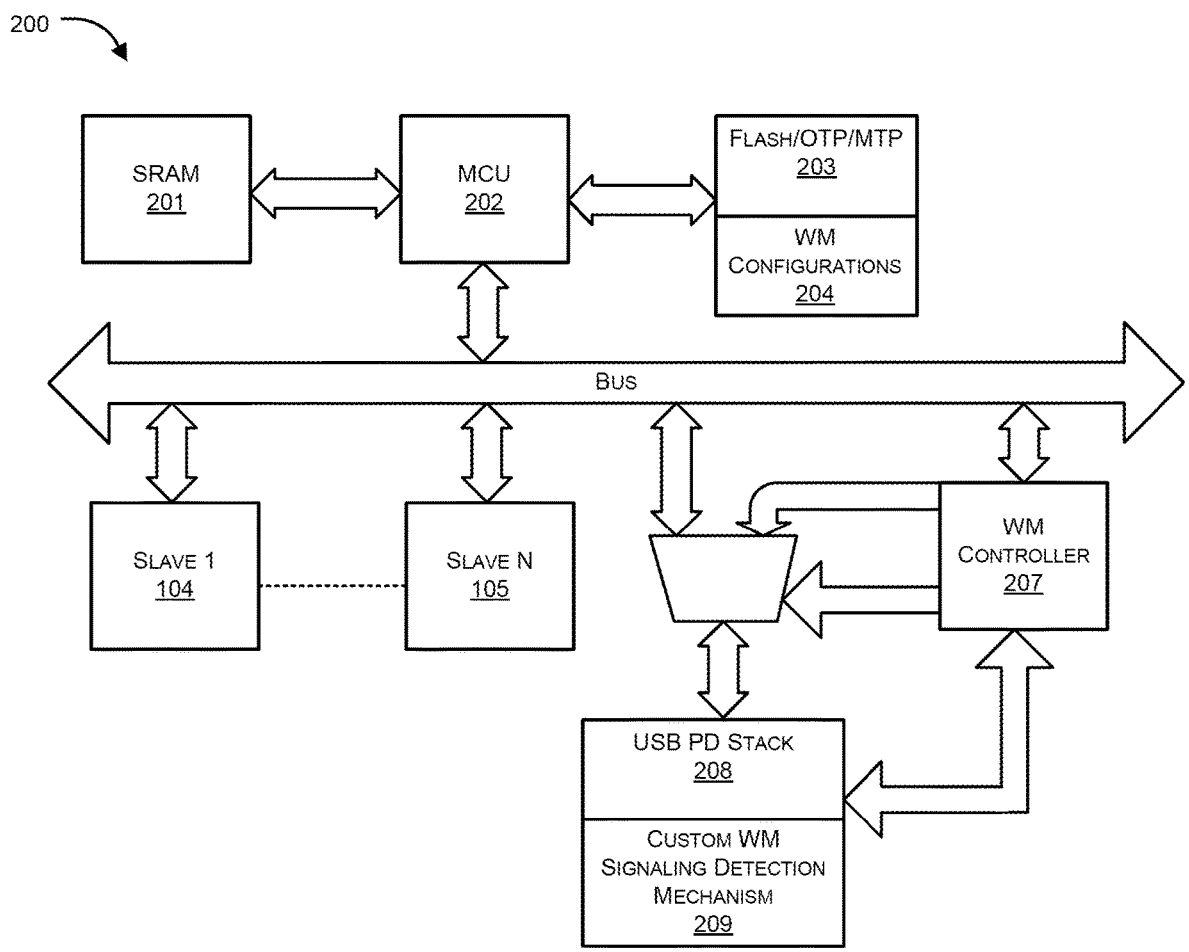
FIG. 2 illustrates an exemplary USB Type-C and PD protocol hardware sub-system that has been implemented with all components associated with providing a watermark to the USB Type-C and PD protocol hardware system, in accordance with an embodiment of the present disclosure.

In an exemplary embodiment, the tester 116 may include a watermarking (WM) controller 207 (Ref. FIG. 2) (simply referred as the controller 207 hereinafter). The tester 116 further may include one or more processors that executes a set of executable instructions that are stored in a memory, upon which execution, the processor causes the controller to generate the watermarking signal in the USB Type-C and PD controller 124. The watermarking signal may include a custom signal and a custom packet associated with a configured custom signal stored in a data buffer that is associated with the SOC/IC system. The custom signal and the custom packet may be a combination of a preamble, one or more ordered sets composed of K-Codes and an End of packet (EOP). The tester may generate a predefined value based on the one or more ordered sets composed of K codes. In an exemplary embodiment, the data buffer associated with the SOC/IC system can be a transmitting or a receiving buffer.

The controller may then transmit the watermarking signal on one or more configuration channel (CC) lines coupled to the Type-C port of the USB Type-C and PD protocol hardware sub-system associated with the DUT 120. In an exemplary embodiment, the hardware subsystem of the DUT 120 may include a watermarking signal detection module configured to detect the watermarking signal transmitted by the tester 116 on the configuration channel (CC) lines coupled to the Type-C port of the USB Type-C and PD protocol associated with the hardware subsystem. The watermarking signal detection module can automatically take control of the USB Type-C and PD stack and the bus interface, thus bypassing the SOC/IC microcontroller associated with the hardware subsystem through a multiplexer structure. The watermarking signal detection module may then respond with the response signal. The response signal may further include a pre-defined packet having a vendor identity (ID) and a secret code corresponding to the combination of K-codes received in the watermarking signal transmitted by the tester 116 such that the predefined packet may be fetched through a key-value mechanism implying a unique code corresponding to each combination of K-codes sent by the tester 116. The response signal may thus include a combination of a preamble, start of packet (SOP) Ordered Set, the Vendor ID and/or the secret code, a cyclic redundancy code (CRC) and an EOP.

The watermarking signal detection module may then transmit the response signal through a buffer in the existing USB Type-C and PD stack.

In an exemplary embodiment, the response signal may then be detected by a watermarking detection mechanism 209 (Ref. FIG. 2) of the tester 116. A watermarking indication interface may be associated with the tester 116. The watermarking indication interface may determine from the response signal received if the DUT is a watermarked or a non-watermarked device based on comparison of the custom signal and the custom packet with the predefined value provided by the tester.

In an exemplary embodiment, the system may be associated with a look up table associated with the SOC/IC system. The look up table may include a plurality of configured custom signals with at least one of the plurality of the configured custom signals corresponding to a watermarking signal detected by the watermark detection mechanism. The transmission of the response signal to the watermark indication interface may be by means of associated configuration channel lines of the USB PD transceiver.

In an exemplary embodiment, the tester 116 can provide the custom packet to the USB PD receiver in a predetermined format of the system. The tester 116 can decode the response signal received in response to the custom packet sent by the tester to match the any or a combination of the vendor ID and the secret code built in the system. Furthermore, the tester 116 can test any device with a USB Type-C port in field without having a need to have special probes or lab equipment.

FIG. 2 illustrates an exemplary USB Type-C and PD protocol hardware sub-system that has been implemented with all components associated with providing a watermark to the USB Type-C and PD protocol hardware system, in accordance with an embodiment of the present disclosure.

One embodiment of the present invention is a system and the other embodiment of the present invention is a method. FIG. 2 shows the exemplary embodiment, a system 200 for watermarking a USB Type-C and PD protocol hardware sub-system that is associated with a SOC/IC system. The system 200 essentially includes the watermark (WM) controller 207, the custom signal or the WM detection mechanism 209, and a USB Type-C and PD stack 208. These three components are further connected, so as to conduct transactions with each other, to a larger SOC (system on a chip)/IC (integrated circuit) system which includes a static random-access memory (SRAM) 201, a microcontroller unit (MCU) 202, a flash memory 203 which may store code for the MCU.

The SOC/IC system includes other slave components 205, 206 and one of the slave components is the USB Type-C and PD stack 208 whose components are standardized and which may be appreciated by a person skilled in the art. As can be seen from FIG. 2 and FIG. 1A, FIG. 1A depicts no WM hardware while the system in FIG. 2 including a watermarking signal detection module that can include a multiplexer 210, a WM controller 207 and the USB Type-C and PD stack 208 that may be coupled with a custom WM signal detection module 209 (also referred to as WM detection mechanism 209).

Referring again to FIG. 2, the components mentioned and depicted are all used for reasons pertaining to their functions and as such, other alternative devices that may be present in the current art or that which may be transpired in the future may be utilized to serve such functions.

The WM signal detection module 209 is mechanism that is configured to detect a custom signal (not shown) generated in the USB Type-C and PD stack 208 during its operation and retrieve a configured custom signal (not shown) from a look-up table corresponding to key-value pair per received custom signal. The configured custom signal corresponds in characteristic to the detected custom signal. These can include devices that employ electrical concepts, mechanical concepts, computer concepts, and other concepts that can be appreciated by a person skilled in the art. In some embodiments, the memory system 203 can include a flash memory, OTP, MTP, and other such systems that may serve a relevant function as disclosed herein.

The watermark controller 207 includes a look up table (LUT) that further includes a number of pre-defined configurations of custom signals (not shown) that can transpire in events associated with USB Type-C and PD protocol hardware system. By way of installing/storing these configurations, such transpiring respective custom signals can be accounted for with respect to the watermarking aspect associated with the USB Type-C and PD protocol hardware sub-system.

The WM controller 207 is a controlling mechanism that is typically used in the field of computer systems and which can be manipulated by a user. In the current embodiment, the WM controller has multiple functions as is heretofore described. One crucial aspect or function of the WM controller 207 is that of generating and transmitting a custom packet that is associated with the configured custom signal to a data buffer that is associated with the SOC/IC system. The data buffer is typically a transmitting and receiving buffer but other buffers or systems that serve the same function can also be used in other embodiments.

Referring again to FIG. 2, the USB Type-C and PD stack 208 includes a USB PD transmitter (not shown) whose primary function is the transfer of data and power. The USB PD transmitter is based on and functions according to industry defined standards for information transfer and as such relies on for instance, in this case, USB PD protocol. In the current embodiment, the USB PD transmitter is configured to receive the data packet generated at the WM controller 207 and transmit it to a watermark indication facility such as a test facility that is either associated with the manufacturer or otherwise. The transmission of the data packet is done by means of configuration channel lines associated with the USB Type-C and PD stack.

While FIG. 2 depicts a generally desired system for watermarking a USB Type-C and PD protocol hardware sub-system, other embodiments are also possible that fall under the scope and spirit of the current disclosure.

For instance, in one embodiment, the detection associated with the watermark detection mechanism is based on ordered sets that are composed of K-Codes. In another embodiment, the detection can take the form of any plausible mechanism or system that serve the function of detection.

Figure 3:
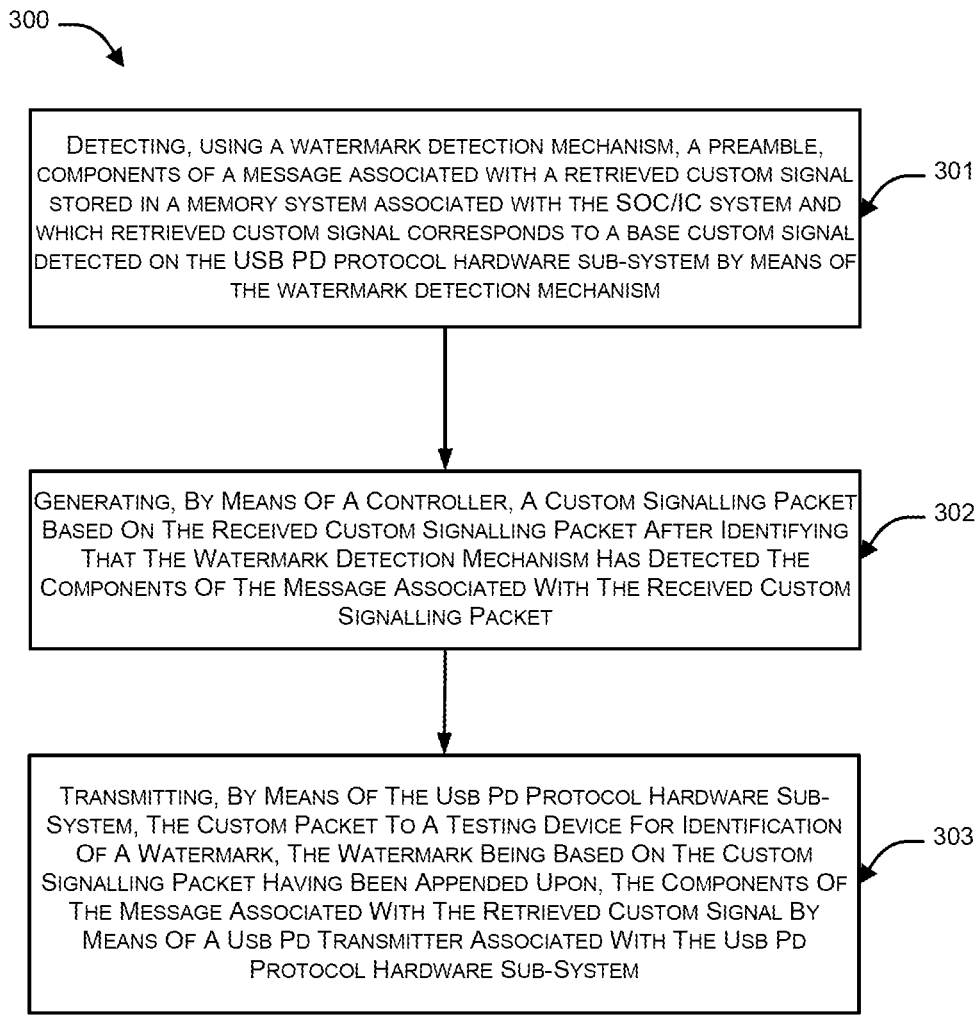
FIG. 3 illustrates yet another exemplary embodiment in a flow diagram form which particularly depicts a method to watermark a USB Type-C and PD protocol hardware sub-system associated with a SOC/IC system.

FIG. 3 illustrates a yet another exemplary embodiment in a flow diagram form which particularly depicts a method to watermark a USB Type-C and PD protocol hardware sub-system associated with a SOC/IC system. The method (300) may include at 302 the step of generating a watermarking signal by a tester. The watermarking signal may be a custom signal and a custom packet associated with a configured custom signal stored in a data buffer that is associated with the SOC/IC system. The tester further includes a controller having one or more processors that executes a set of executable instructions that are stored in a memory. The method (300) at 304 includes the step of transmitting the watermarking signal by the tester on one or more configuration channel (CC) lines coupled to a Type-C port of the USB Type-C and PD protocol hardware sub-system associated with a device under test (DUT) and then at 306, the step of detecting, by a watermarking detection mechanism of the tester, a response signal generated and transmitted by the hardware subsystem of the DUT, the response signal is a response to the watermarking signal transmitted by the tester. Further, at 308, the method (300) includes the step of determining, by a watermarking indication interface associated with the tester, from the response signal received if the DUT is a watermarked or a non-watermarked device based on comparison of the custom signal and the custom packet with a predefined value provided by the tester.

While the above-mentioned embodiments are exemplary, other embodiments are also possible without deviating from the spirit and scope of the invention.

In one embodiment, the WM detection mechanism 209 covers all the functionalities as follows. A first step includes the detection of a preamble associated with the custom signal as defined in the USB PD specification. A second step includes the detection of the custom signal while the third step includes the detection of EOP K-Code after indication from the WM detection mechanism 209 that the packet has been completely detected.

In another embodiment, the WM controller 207 covers all the functionalities as follows. Here, a first step involves the identifying that the detection mechanism 209 has detected the custom signal and then generating the custom packet to be responded based on the key-value pair for the custom signal received and retried through a look-up table. The controller 207 then assumes control of the SOC/IC system to the extent that the USB Type-C and PD stack 208 is indicated regarding the transmission of the custom packet. Once the packet transmission is complete, the controller 207 gives up the control of the bus for the MCU 202 to take control as shown in FIG. 1.

In another embodiment, the USB PD transmitter covers all the functionalities as follows. It adds preamble as per USB PD protocol at the start of the data packet received from TX buffer and then adds the SOP type after the preamble as per USB PD protocol and before the data packet gets transmitted. The USB PD transmitter then transmits the message/custom packet on the CC line which provides a confirmation of respective vendor configuration and hence watermarking of the USB Type-C and PD protocol hardware sub-system is realized. Other message components such as CRC and EOP can also be added at the end of the custom packet for making it a USB PD compatible packet and for facilitating final reception by the tester block.

Figure 4A:
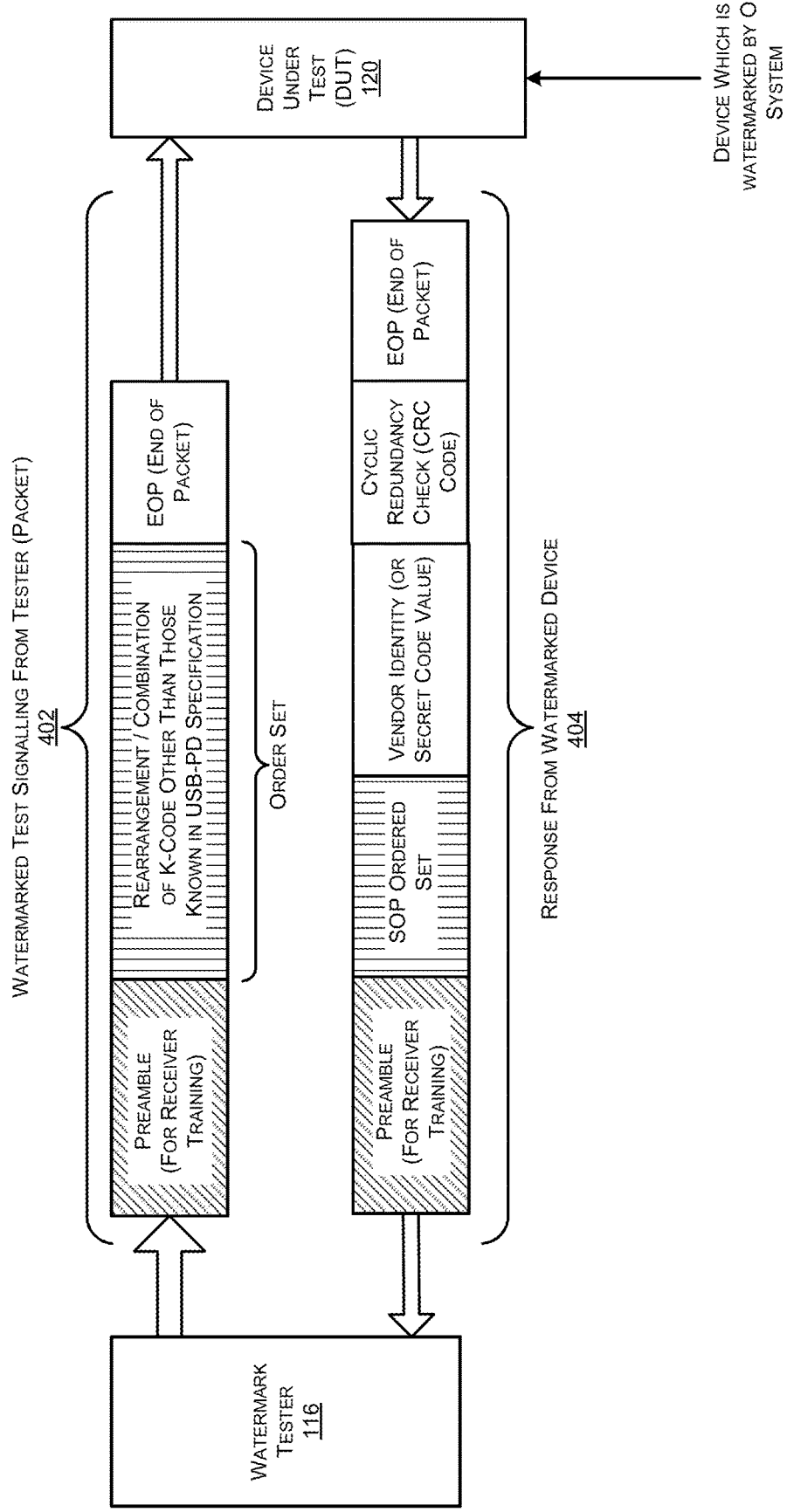
FIG. 4A illustrates an exemplary representation of packet transmission and reception, in accordance with an embodiment of the present disclosure.

FIG. 4A illustrates an exemplary representation of packet transmission and reception between the tester 116 and the DUT 120. As illustrated, the tester 116 can send a watermark test signal 402 that may include a preamble for receiver training, a combination or re-arrangement of one or more K-Codes to form the ordered sets other than those defined in the USB PD specification and an end of packet (EOP). The DUT 120 can provide a response 404 that may include a preamble for receiver training, SOP ordered set, vendor identity or secret code value, cyclic redundancy check (CRC) code and an end of packet (EOP)

It would be appreciated that although the proposed system and method has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system and method can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system and method is configured are well within the scope of the present invention.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides a method and system for watermarking a USB Type-C and PD protocol hardware subsystem existing as a slave to an SOC/IC system.

The present disclosure provides a simple and cost-effective method and system completely based on hardware for watermarking a USB Type-C and PD protocol hardware subsystem existing as a slave to an SOC/IC system.

The present disclosure provides a reliable and efficient method and system for watermarking a USB Type-C and PD protocol hardware subsystem existing as a slave to an SOC/IC system.

The present disclosure provides a robust method and system for watermarking a USB Type-C and PD protocol hardware subsystem existing as a slave to an SOC/IC system.

The present disclosure provides a tester to test the system for watermarking at field level including the products available in the market using the USB PD infrastructure and always exposed USB Type-C port

The invention claimed is:

1. A system for watermarking a Universal Serial Bus (USB) Type-C and Power Delivery (PD) protocol hardware sub-system existing as a part of a System on Chip/Integrated Circuit (SOC/IC) system, the system for watermarking comprising:
  a tester to generate a watermarking signal;
  a device under test (DUT), wherein the DUT is configured with a USB Type-C port with power delivery implementation and including:
    a hardware subsystem configured for watermarking the DUT and transmit a response signal upon receipt of the watermarking signal from the tester,
  wherein the tester comprises a controller, the controller comprising one or more processors that execute a set of executable instructions that are stored in a memory, upon which execution, the one or more processors cause the controller to:
    generate the watermarking signal, said watermarking signal comprises a custom signal and a custom packet associated with a configured custom signal stored in a data buffer that is associated with the SOC/IC system;
    transmit the watermarking signal on one or more configuration channel (CC) lines coupled to the USB Type-C port of the USB Type-C and PD protocol hardware sub-system associated with the DUT;
    detect, by a watermarking detection mechanism of the tester, the response signal generated and transmitted by the hardware subsystem of the DUT, said response signal is a response to the watermarking signal transmitted by the tester, wherein the watermarking detection mechanism of the tester comprises a multiplexer; and
    determine, by a watermarking indication interface associated with the tester, from the response signal received if the DUT is a watermarked or a non-watermarked device based on comparison of the custom signal and the custom packet with a predefined value provided by the tester.

2. The system as claimed in claim 1, wherein the custom signal and the custom packet further comprises a combination of a preamble, one or more ordered sets composed of K-Codes and an end of packet (EOP), and wherein the predefined value is based on the one or more ordered sets composed of K-Codes.

3. The system as claimed in claim 1, wherein the DUT is coupled to a USB PD transceiver that receives the watermarking signal and transmits the response signal if the DUT is a watermarked device, wherein the response signal is a combination of a preamble, start of packet (SOP) Ordered Set, a Vendor ID and or a secret code, a cyclic redundancy code (CRC) and an end of packet (EOP).

4. The system as claimed in claim 1, wherein the detection of the watermarking signal is based on one or more ordered sets composed of K-Codes, and wherein identification of whether the DUT is a watermarked device by the watermarking indication interface is based on any or a combination of a vendor identity construct of a USB PD specification, and a secret code corresponding to the predefined value provided by the tester.

5. The system as claimed in claim 1, wherein the system is associated with a look up table associated with the SOC/IC system, said look up table includes a plurality of configured custom signals with at least one of the plurality of configured custom signals corresponding to a watermarking signal detected by the watermark detection mechanism, and wherein transmission of the response signal to the watermarking indication interface is by associated configuration channel lines of a USB PD transceiver.

6. The system as claimed in claim 1, wherein the data buffer associated with the SOC/IC system is a transmitting or a receiving buffer.

7. A tester for testing watermarking in any Universal Serial Bus (USB) Type-C based system, the tester for watermarking comprising:
  a controller comprising one or more hardware processors that execute a set of executable instructions that are stored in a memory, upon which execution, the one or more hardware processors cause the controller to:
  generate a watermarking signal to be transmitted on one or more configuration channel (CC) lines in a USB Type-C and Power Delivery (PD) protocol hardware sub-system of a device under test (DUT) during an operation, wherein said watermarking signal comprises a custom signal and a custom packet associated with a configured custom signal stored in a data buffer that is associated with a System on Chip/Integrated Circuit (SOC/IC) system;
  transmit the watermarking signal on one or more configuration channel lines coupled to a Type-C port of the USB Type-C and PD protocol hardware sub-system of the DUT;
  a watermarking detection mechanism comprising a hardware multiplexer, the watermarking detection mechanism detects a response signal transmitted by the DUT, said response signal is a response to the watermarking signal transmitted by the controller; and
  a watermarking indication interface that determines from the response signal received if the DUT is a watermarked or a non-watermarked device.

8. The tester as claimed in claim 7, wherein the tester detects the response signal from the DUT if the DUT is a watermarked device, and wherein the response signal is a combination of a preamble, start of packet (SOP) Ordered Set, a vendor identity (ID) and a secret code, a cyclic redundancy code (CRC), and an end of packet (EOP).

9. The tester as claimed in claim 7, wherein the tester provides the custom packet to a USB PD receiver in a predetermined format of the system, and wherein the tester decodes the response signal received in response to the custom packet sent by the tester to match one or a combination of a vendor identity and a secret code built in the system.

10. The tester as claimed in claim 7, wherein the tester tests the DUT without having a need to have special probes or lab equipment.

11. A method for watermarking a Universal Serial Bus (USB) Type-C and Power Delivery (PD) protocol hardware sub-system existing as a part of a System on Chip/Integrated Circuit (SOC/IC) system, the method for watermarking comprising:
   generating a watermarking signal by a tester, said watermarking signal comprises a custom signal and a custom packet associated with a configured custom signal stored in a data buffer that is associated with the SOC/IC system, wherein the tester comprises a controller, the controller comprising one or more processors that executes a set of executable instructions that are stored in a memory;
   transmitting the watermarking signal by the tester on one or more configuration channel (CC) lines coupled to a Type-C port of the USB Type-C and PD protocol hardware sub-system associated with a device under test (DUT);
   detecting, by a watermarking detection mechanism of the tester, a response signal generated and transmitted by a hardware subsystem of the DUT, said response signal is a response to the watermarking signal transmitted by the tester, wherein the watermarking detection mechanism of the tester comprises a multiplexer; and
   determining, by a watermarking indication interface associated with the tester, from the response signal received if the DUT is a watermarked or a non-watermarked device based on comparison of the custom signal and the custom packet with a predefined value provided by the tester.

12. The method as claimed in claim 11, wherein the custom signal and the custom packet further comprises a combination of a preamble, one or more ordered sets composed of K-Codes and an end of packet (EOP), and wherein the predefined value is based on the one or more ordered sets composed of K-Codes.

13. The method as claimed in claim 11, wherein the DUT is coupled to a USB PD transceiver that receives the watermarking signal and transmits the response signal if the DUT is a watermarked device, and wherein the response signal is a combination of a preamble, start of packet (SOP) Ordered Set, a Vendor ID and a secret code, a cyclic redundancy code (CRC) and an end of packet (EOP).

14. The method as claimed in claim 11, wherein the detection of the watermarking signal is based on one or more ordered sets composed of K-Codes, and wherein identification of whether the DUT is a watermarked device by the watermarking indication interface is based on one or a combination of a vendor identity construct of a USB PD specification, and a secret code corresponding to the predefined value provided by the tester.

* * * * *